March 27, 1934.  H. C. BOTSFORD  1,952,742
SELF LOADING DUMP TRUCK
Filed May 1, 1933  3 Sheets-Sheet 1
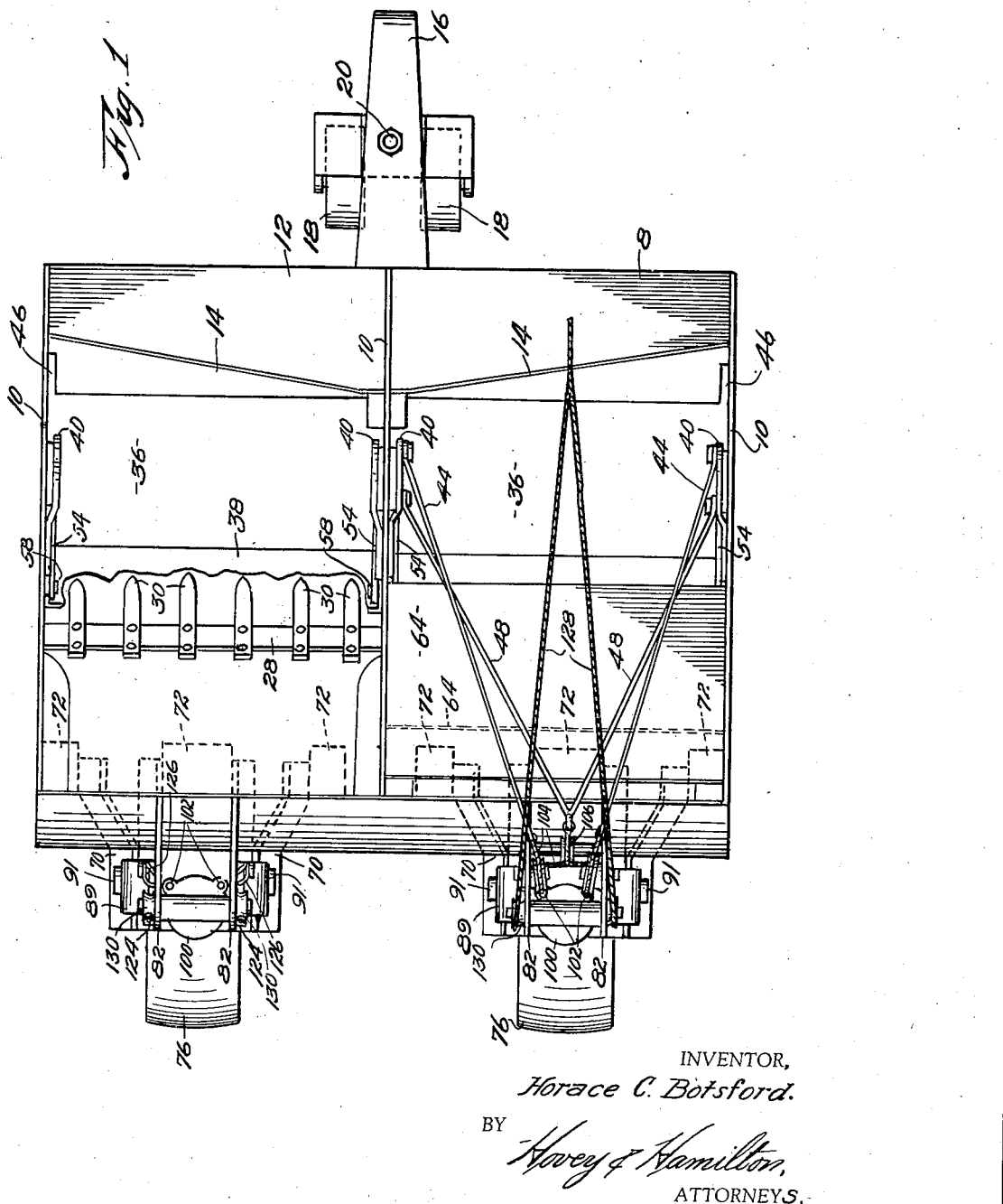
INVENTOR,
Horace C. Botsford.
BY
Hovey & Hamilton,
ATTORNEYS.

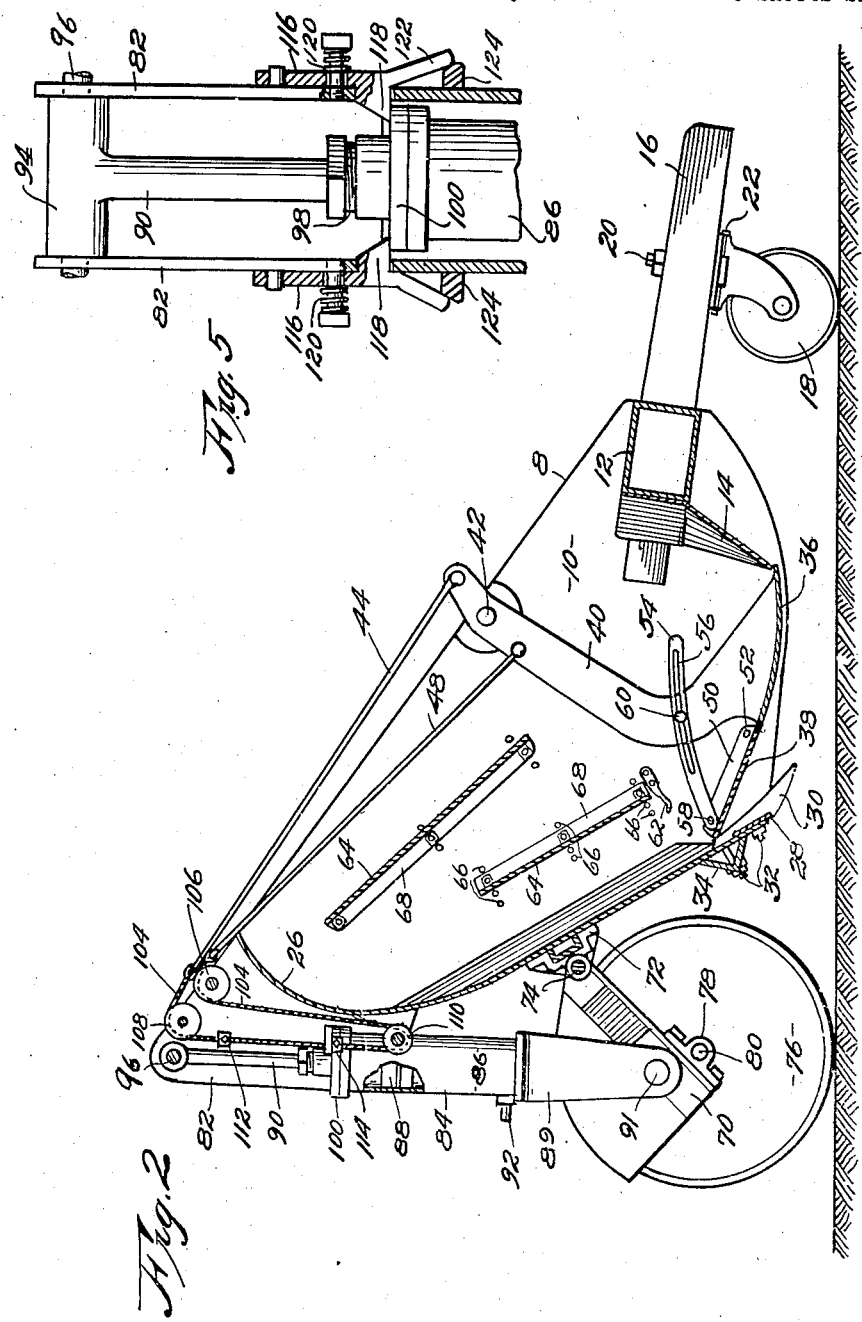

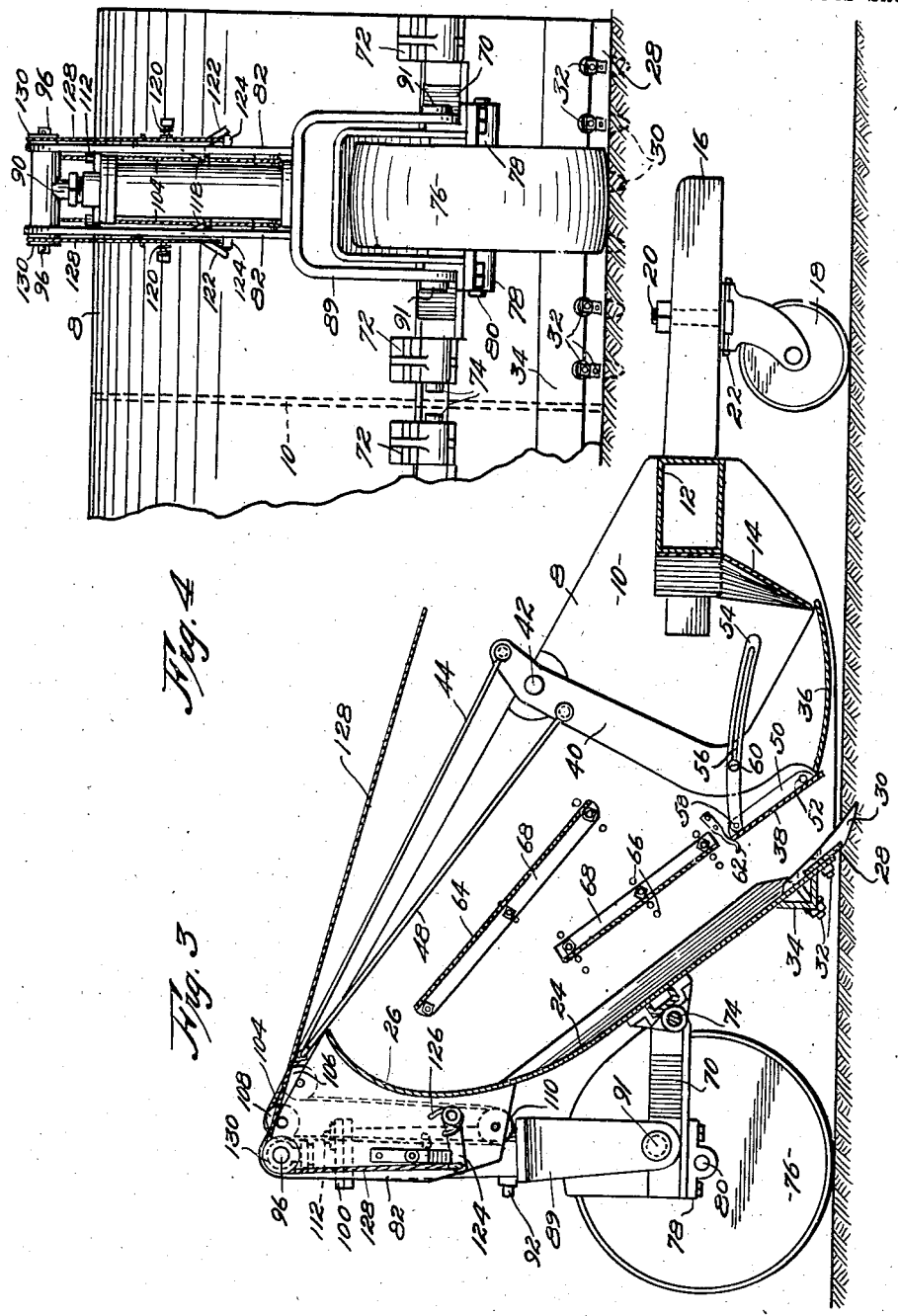

Patented Mar. 27, 1934

1,952,742

UNITED STATES PATENT OFFICE 1,952,742

SELF-LOADING DUMP TRUCK

Horace C. Botsford, Kansas City, Mo.

Application May 1, 1933, Serial No. 668,775

16 Claims. (Cl. 37—131)

This invention relates to earth handling equipment and has particular reference to self-loading dump trucks having the nature of a scoop and equipped with wheels whereby after the truck has been pulled along to be filled with the earth, the same is utilized in transporting the collected material from one place to another.

One of the important aims of the instant invention is to provide a self-loading dump truck which has an opening formed in the bottom thereof, through which enters the material being dislodged and moved, said opening being equipped with novelly constructed closures that are automatically moved to and from the operative position as the bowl of the truck is raised and lowered from the digging or earth collecting positions.

A yet further object of the invention is the contemplation of earth handling equipment in the form of a self-loading dump truck wherein is built unique power means for raising the bowl of the truck from the digging or earth collecting position, said power means having connection with the hereinbefore mentioned closures for the opening formed in the bowl, whereby as the bowl is raised and lowered, said closures will automatically move to and from the operative position.

An even further aim of this invention is the provision in a self-loading dump truck of hydraulic power means for raising the bowl of the truck after the same has been filled with material, said power means being equipped with supplementary holding or locking mechanism which assists in supporting the load during the time the dump truck is transporting the material held within its bowl.

Another object of the invention is to provide a self-loading dump truck having a pivotally mounted frame and wheel and a power means for raising and lowering the bowl, wherein said parts are disposed in a unique manner with an inclined wall of the bowl so that a minimum amount of strain is placed upon all of the parts of the dump truck as the same are operated.

Other objects of this invention, the manner of making a self-loading dump truck embodying the preferred form of this invention, and the operation of the truck will be made apparent in the following specification, referring to the accompanying drawings, wherein:

Figure 1 is a top plan view of a double unit self-loading dump truck embodying the present invention, parts being broken away for clearness.

Fig. 2 is a vertical, irregular, central section through one of the units of the self-loading dump truck, illustrating the same in the raised or material carrying position.

Fig. 3 is a similar vertical, irregular, central section, but through only the bowl of the dump truck, the parts thereof being positioned in a digging or earth collecting position.

Fig. 4 is a fragmentary, rear elevation of the dump truck showing the hydraulic jack and its position above and secured to the wheel frame, and, Fig. 5 is an enlarged, fragmentary, detailed view showing the releasable means for locking the jack against movement in one direction, whereby the jack is assisted in supporting the load within the bowl of the truck.

In the drawings, wherein like reference characters are used to designate similar parts throughout all the views, numeral 8 indicates a bowl preferably constructed of strong sheet metal and comprising substantially parallel, vertical side walls 10 joined along their forward end by a bolster 12 that carries a depending apron 14 to form a forward end for bowl 8. To bolster 12 is affixed a draw tongue 16 that may be connected in any suitable or well known manner to a tractor or other source of power through the medium of tractor hitches, connections, links, or any such mechanism as is well known in this art, there being no relation of such members to this invention and, therefore, no showing of the same being necessary.

In most instances it is desirable to provide a tiller wheel 18 beneath tongue 16 which may be pivotally secured thereto by a bolt 20 which permits rotation of the tiller wheel structure about a vertical axis. It has been found desirable in some instances to incorporate horizontal pivot bolts 22 to permit tilting of wheel 18 out of the vertical plane. Such tiller wheels and their function are understood, and while the one herein illustrated may sometimes be eliminated from self-loading dump trucks of certain sizes, it is desirable to assist the pulling machine to the extent of relieving it from supporting the forward portion of bowl 8 through the use of such a wheel.

Side walls 10 are joined along the end opposite from bolster 12 and along a portion of their lowermost edge by an inclined wall 24 which curves inwardly and forwardly along its uppermost portion, as shown at 26, so that the earth which is forced along wall 24 will be directed back into bowl 8 as the truck is being loaded. The lowermost edge of wall 24 is provided with a blade 28 and a series of teeth 30, both of which are secured to wall 24 through the use of suitable bolts 32. As shown in Fig. 3, each tooth 30 is traversed by two of these bolts 32, one of which passes through blade 28 and wall 24, while the other merely passes through wall 24 and a strengthening angle iron 34 positioned along the lowermost side of wall 24. When the truck is in the self-loading position and being drawn by a tractor or the like, teeth 30 and blade 28 dig into the earth as shown in Fig. 3, and the forward movement of the entire truck draws the thus loosened earth into bowl 8. Teeth 30 are utilized for the purpose of effectively breaking up the earth as it is dug and likewise to prevent introducing the earth into bowl 8 in the form of flat sheets which, when the earth is of a certain consistency, will cause a vast amount of difficulty if allowed to enter bowl 8 in that form.

From the foregoing description of bowl 8 it is obvious that an opening, bounded by blade and teeth 28 and 30 respectively, apron 14 and the two side walls 10, is created through which the earth is forced when the truck is being loaded, and through which the materials may fall when the bowl is being dumped.

In carrying out one of the important aims of this invention, and to render this self-loading truck highly efficient in moving vast amounts of earth, a closure for this opening just mentioned is provided in the form of a swinging bottom and a pivotally mounted guard plate 36 and 38 respectively. Bottom 36 is merely an arcuate plate, to which is secured a pair of hangers 40. There is one hanger at each end of bottom 36 and the same should be specially formed as clearly illustrated to permit bottom 36 to swing beneath apron 14 as movement about pivot pins 42 takes place. As shown, a portion of each hanger 40 extends above pivot pin 42 to be joined by an operating rod 44, and while the angularity formed in hanger 40 is such as to practically clear apron 14, it is necessary to form slots 46 to allow bottom 36 to swing completely beneath the lower edge of apron 14. It is obvious that the curvature of bottom 36 is such that the lower edge of apron 14 will remain an equal distance therefrom as the bottom is swung about pivot pins 42. These pivot pins are secured to side walls 10, and since the power means is between these walls, puller rods 44 extending from each hanger 40 must converge as shown in Fig. 1. Rods 44 will exert a pull upon hangers 40 to move bottom 36 forwardly beneath apron 14 and puller rods 48, secured to the hangers 40 below pivot pins 42, will draw bottom 36 back to the position shown in Figs. 2 and 3. Rods 48 likewise converge and, as a matter of fact, these rods may be joined at one end as shown in Fig. 1, to form a large V.

Bottom 36 partially closes the opening formed in the lowermost part of bowl 8 and the closure for this opening is completed through the employment of a guide plate 38, flanged along each end thereof as at 50 and pivotally mounted to side walls 10 by pintles 52. A longitudinally arched link 54, having a slot 56 therein, joins the edge of guard plate 38 farthest removed from bottom 36 to hangers 40. One end of link 54 is pivotally joined as at 58 to flange 50 and a pin 60 rides in slot 56 as hanger 40 moves about pivot pin 42. A portion of the opening in bowl 8 must be kept open during loading operation and guard plate 38 assumes the position shown in Fig. 3 during such operation.

A releasable detent 62 assists in maintaining plate 38 in the open position while its lowermost edge projects below bottom 36 to bear thereagainst, and until bottom 36 is caused to move slightly forwardly, plate 38 will remain in the position shown. Inclined baffles 64 extend transversely of bowl 8 from one side wall to the other, and in view of some conditions that are met, it is desirable to have these baffles 64 mounted for adjustment whereby they will both direct and support the earth collected within bowl 8.

The manner of adjusting these baffles 64 may be simply a series of holes 66 formed in sides 10 in register with similar holes in the laterally extended flanges 68 of baffles 64 so that suitable securing means may be passed through these holes where desired.

A frame 70 is pivotally mounted on the inclined wall 24 of bowl 8 near the lower edge thereof through the medium of bearings 72 and shaft 74. A wheel 76 is carried by frame 70 and may be mounted for rotation upon frame 70 through the medium of bearings 78 and axle 80. This wheel supports the load and all of the weight that is not carried by tiller wheel 18 and because of the fact that frame 70 is pivotally mounted on the bowl as shown, it is possible to raise bowl 8 from the self-loading position to an earth-carrying position such as that shown in Fig. 2.

Frame and wheels 70 and 76 respectively, together with the associated parts, are disposed partially beneath inclined wall 24 of bowl 8 so that as much of the load as possible might be above this structure. The upper portion of wall 24 is projected over wheel and frame 76 and 70 respectively, and it is upon this projected portion of wall 24 that the two spaced-apart brackets 82 are mounted.

Reference to Figs. 1 and 4 will readily teach that all of the parts mounted upon inclined wall 24 should be substantially central between the sides 10. Power means is provided to raise bowl 8 by causing frame and wheel 70 and 76 respectively to pivot about shaft 74. This power means is in the form of an hydraulic jack 84 which interconnects brackets 82 and frame 70, and which comprises a cylinder 86 having a piston 88 therein which is joined to piston rod 90 in the conventional manner. Yoke 89, integral with the bottom of cylinder 86, is pivotally joined to frame 70 by pins 91. A tube 92 is in communication with the lowermost portion of cylinder 86 and in practice is joined with a suitable source of supply of fluid under pressure that may be moved into cylinder 86 and against piston 88 when it is desired to force brackets 82 and the free end of frame 70 further apart.

A cross head 94, integral with piston rod 90, has pivotal connection with bracket 82 through the medium of shaft 96, and the usual stuffing box or analogous structure 98 may be provided where piston rod 90 passes from cylinder 86. A plate 100 mounted on the upper end of cylinder 86 forms a pair of eyes 102 through which pass the branches of cable 104. This cable joins the ends of puller rods 44 and 48 and passes over pulley wheels 106 and 108, disposed near the top of brackets 82 and over a similar wheel 110, positioned near the bottom of brackets 82.

There is but one pulley wheel 106, while wheels 108 and 110 are in pairs above and below plate 100, through which is formed eyes 102. Wheels 108 and 110 are respectively above and below plate 100 and a collar 112 and a collar 114 is rigidly secured in spaced-apart relation to each branch of cable 104 which rides over pulley wheel 108 and 110 and which also extends through one of eyes 102 formed in plate 100. Plate 100 appropriately strikes either collar 112 or collar 114 as the power means 84 is operated to raise or lower bowl 8 and the closure for the opening formed in the bottom of bowl 8 is moved to and from the operative position as will hereinafter be set forth.

When the hydraulic jack 84 has been extended as shown in Fig. 2, bowl 8 is usually filled with earth and a considerable distance must be traversed before bowl 8 is dumped. Supplemental means is provided, therefore, to assist the power means 84 in maintaining bowl 8 in the raised position. This means positively precludes accidental lowering of bowl 8 and the means supplemental to hydraulic jack 84 must be released by the operator before bowl 8 can again return to the self-loading position.

Reference to Figs. 3 and 5 may be made to visualize the structural features embodied in carrying out this part of the invention. Each bracket 82 has a dog 116 mounted thereon, with an inclined portion 118 projecting through an opening formed in the bracket into the path of travel of plate 100. A compression spring 120 bears against dog 116 to constantly and yieldably urge inclined portion 118 into this path of travel and an outwardly directed inclined portion 122 of dog 116 creates a space between bracket 82 and its inner face, into which a release arm 124 may be moved. This release arm is pivotally mounted on bracket 82 and a spring 126 maintains pressure upon arm 124 to keep it from engagement with portion 122.

There is one dog 116 on each bracket 82 and as plate 100 travels downwardly, the inclined face of portion 118 will be struck thereby and dogs 116 moved outwardly as spring 120 is compressed. When portions 118 are passed, dogs 116 will be snapped into the position shown in Fig. 5 to have their shoulders resting upon the top of plate 100. When the parts are in this position, the supporting power of hydraulic jack 84 could be entirely released, yet the dogs 116 resting upon the top of plate 100 would carry the load.

When it is necessary to lower bowl 8 the operator merely pulls cable 128 which is secured to the free end of release arms 124 and which passes over pulley wheels 130 maintained on shaft 96 and dogs 116 will be moved outwardly from the path of travel of plate 100 and the action of gravity will move the parts toward the lowered position.

*Operation*

Fig. 3 illustrates the self-loading dump truck in an operative position where it is digging and collecting earth and as the earth is forced into bowl 8, it is moved upwardly along inclined wall 24 to curved portion 26 from where it is directed to deflectors 64, which in turn cause it to be projected forwardly against apron 14 and upon the upper face of bottom 36 and guard plate 38. Obviously, the weight of the collected earth will be borne by these three last mentioned members and the throat, formed between guard plate 38 and blade 28, will be maintained unobstructed. This action takes place as the dog is being drawn forwardly and when bowl is filled, hydraulic jack 84 is caused to operate and move frame 70 about shaft 74. This operation takes place as a result of forcing fluid under pressure into cylinder 86 against piston 88, and as the rear end of bowl 8 is being hoisted, plate 100 moves along cable 104 to strike collars 114, whereupon bottom 36 will be moved forwardly beneath apron 14 just far enough to free guard plate 38.

As soon as the contact between bottom 36 and guard plate 38 is broken, detent 62, because of the over load, will release guard plate 38 and it will move down to the position shown in Fig. 2. Obviously, the weight of the earth piled therebehind will cause such action.

When hydraulic jack 84 has moved to this position where it causes the action just set down, dogs 116 will have been moved into engagement with the upper side of plate 118 and the auxiliary supporting mechanism in the form of these dogs 116 and associated parts will be assisting hydraulic jack 84 to support the entire dump truck and its parts in the position illustrated in Fig. 2. When the operator reaches the point where it is desired to dump the earth from bowl 8, hydraulic jack receives fluid under pressure which further expands the distance between point 91 and shaft 96 which also raises the lower portion of bowl 8 farther from the ground and likewise simultaneously moves puller rods 44 to swing bottom 36 forwardly beneath apron 14. This action is created because plate 100 engages collar 114 and pulls the associated cable 104 along as jack 84 expands.

As bottom 36 is traveling forwardly, plate 38 remains in the lowered position shown in Fig. 2 and a space is created between plate 38 and bottom 36. It is through this space that a certain amount of the earth pushed from bottom 36 by apron 14 is caused to drop. When pin 60 reaches the end of slot 56, sufficient force is exerted to raise guard plate 38 to the position shown in Fig. 3 and to a place where detent 62 exerts a holding force. Thus with bowl 8 raised and the opening formed therethrough substantially unobstructed, all of the earth in bowl 8 will drop therefrom as the truck is moved forwardly.

As soon as bowl 8 is emptied, cable 128 is pulled to move dogs 116 out of the operative position and the fluid pressure within cylinder 86 is released. The action of gravity will draw the parts down as wheel and frame 76 and 70 respectively rotate about shaft 74 and when plate 100 reaches collar 112, cable 104 will be pulled to draw puller rod 48 inwardly which, obviously, will move bottom 36 back to the position shown in Fig. 3. Detent 62 is holding guard plate 38 in the raised position and slot 56 will permit movement of bottom 36 inwardly until it bears against the lowermost edge of plate 38, in which position the parts are all again in condition for reloading.

Manifestly, self-loading dump trucks made in accordance with this invention present complete units, any number of which may be secured side by side in making up a battery of effective size that may be pulled by any tractor of given size. In some of the views of the drawings, two units are shown together, and when such arrangement is made, the parts of each unit may be individually controlled by the operator. Any number of ordinary mechanical expedients to render the trucks strong and structurally efficient might be employed and such elements as gusset plates, strengthening angle or channel iron and brace rods, not specifically herein set down, should be considered as obvious.

It is understood that structures illustrated and described herein are examples of the invention only for the purpose of supporting the appended claims, and while one preferred form of the invention has been set down, it is clear that such changes and modifications as might be practiced and that fairly fall within the spirit of the invention and scope of the appended claims are secured by the latter.

Having thus described the invention, what is claimed as new and desired to be secured by Letters Patent is:

1. A self-loading dump truck of the character described comprising a bowl having an inclined wall; a frame pivotally mounted on the said inclined wall near the lowermost edge thereof whereby the upper portion thereof is projected over the frame; a wheel carried by the frame; and power means secured to said inclined wall above said frame and wheel, said power means being secured to that portion of the inclined wall projected over the frame.

2. A self-loading dump truck of the character described comprising a bowl having an inclined wall; a frame pivotally mounted on the said inclined wall near the lowermost edge thereof whereby the upper portion thereof is projected over the frame; a wheel carried by the frame; brackets integral with the uppermost, projected portion of said wall; and power means interconnecting said frame and said brackets for moving the wheel and frame about the pivotal connection between frame and bowl to raise the latter.

3. A self-loading dump truck of the character described comprising a bowl having an inclined wall; a frame pivotally mounted on the said inclined wall near the lowermost edge thereof whereby the upper portion thereof is projected over the frame; a wheel carried by the frame; brackets integral with the uppermost, projected portion of said wall; and power means interconnecting said frame and said brackets for moving the wheel and frame about the pivotal connection between frame and bowl to raise the latter, said power means comprising an hydraulic jack having its longitudinal axis substantially vertical whereby upon release of hydraulic pressure therefrom, said bowl and associated parts are lowered by action of gravity.

4. A self-loading dump truck of the character described comprising a bowl having an inclined wall; a frame pivotally mounted on the said inclined wall near the lowermost edge thereof whereby the upper portion thereof is projected over the frame; a wheel carried by the frame; power means interconnecting the upper portion of said wall and said pivotally mounted frame for moving the wheel and frame about the pivotal connection between frame and bowl to raise the latter; and releasable means for securing the bowl against return to the lowered position.

5. A self-loading dump truck of the character described comprising a bowl having an inclined wall; a frame pivotally mounted on the said inclined wall near the lowermost edge thereof whereby the upper portion thereof is projected over the frame; a wheel carried by the frame; hydraulic power means interconnecting the upper portion of said wall and said pivotally mounted frame for moving the wheel and frame about the pivotal connection between frame and bowl to raise the latter from a lowered, self-loading position to the raised carrying position; and means supplementing said hydraulic power means to maintain said bowl in the raised position.

6. A self-loading dump truck of the character described comprising a bowl having an inclined wall; a frame pivotally mounted on the said inclined wall near the lowermost edge thereof whereby the upper portion thereof is projected over the frame; a wheel carried by the frame; hydraulic power means interconnecting the upper portion of said wall and said pivotally mounted frame for moving the wheel and frame about the pivotal connection between frame and bowl to raise the latter from a lowered, self-loading position to the raised carrying position; and means supplementing said hydraulic power means to maintain said bowl in the raised position, said supplemental means comprising releasable locking dogs movable to a locked position after said hydraulic power means has raised the bowl to a certain height.

7. In a self-loading dump truck of the character described, a bowl having a cutting blade along one edge thereof; a frame pivotally mounted on said bowl; a wheel carried by the frame; power means for moving the wheel and frame about the pivotal connection between frame and bowl; and means for locking the said parts against movement in one direction about the said pivotal connection.

8. In a self-loading dump truck of the character described having a bowl, an hydraulic power jack to lift the bowl; and locking dogs associated with the jack automatically movable to position when said jack is extended to a bowl-lifting position.

9. A self-loading dump truck of the character described comprising a bowl having an opening formed in the lower portion thereof; a frame pivotally mounted on the bowl; a wheel carried by the frame; power means interconnecting the bowl and frame to move the wheel and frame about the pivotal connection between frame and bowl in one direction to raise the bowl; and a bottom to open and close the opening of said bowl as the same is raised and lowered.

10. A self-loading dump truck of the character described comprising a bowl having an opening formed in the lower portion thereof; a frame pivotally mounted on the bowl; a wheel carried by the frame; power means interconnecting the bowl and frame to move the wheel and frame about the pivotal connection between frame and bowl in one direction to raise the bowl; a bottom to close the opening; and apparatus joining power means and bottom whereby the latter is automatically moved to and from a position closing said opening as the former raises and lowers the bowl.

11. A self-loading dump truck of the character described comprising a bowl having an opening formed in the lower portion thereof; a frame pivotally mounted on the bowl; a wheel carried by the frame; power means interconnecting the bowl and frame to move the wheel and frame about the pivotal connection between frame and bowl in one direction to raise the bowl; a bottom to partially open and close said opening as said bowl is raised and lowered; and a guard plate to complete the closing of said opening.

12. A self-loading dump truck of the character described comprising a bowl having an opening formed in the lower portion thereof; a frame pivotally mounted on the bowl; a wheel carried by the frame; power means interconnecting the bowl and frame to move the wheel and frame about the pivotal connection between frame and bowl in one direction to raise the bowl; a bottom swingably carried by the bowl to close a portion of the opening; apparatus joining the power means and bottom to swing the same as the power means raises and lowers the bowl; a guard plate pivotally carried by the bowl to complete the closing of the opening; and a link joining said bottom and guard plate for causing simultaneous opening of both bottom and guard plate.

13. In a self-loading dump truck of the character described, a bowl having an inclined wall and an opening forming an entrance to the bowl at the bottom of said wall; a series of teeth along the lowermost edge of said wall; and pivotally mounted plates movable to open and close said entrance.

14. In a self-loading dump truck of the character described, a bowl having an inclined wall and an opening forming an entrance to the bowl at the bottom of said wall; pivotally mounted plates movable to open and close said entrance and deflectors within said bowl to direct material toward said pivotally mounted plates.

15. In a self-loading dump truck of the character described, a bowl having an inclined wall and an opening forming an entrance to the bowl at the bottom of said wall; pivotally mounted plates movable to open and close said entrance and deflectors within said bowl to direct material toward said pivotally mounted plates, said inclined wall and plates being substantially parallel to each other, the inclined wall having an inwardly curved upper portion to direct materials toward said deflectors.

16. In a self-loading dump truck of the character described, a bowl having an inclined wall and an opening forming an entrance to the bowl at the bottom of said wall; an apron forming one edge of said opening; and a pivotally mounted plate movable beneath said apron to open and close said entrance.

HORACE C. BOTSFORD.